US011509523B2

(12) United States Patent
Wienstroer et al.

(10) Patent No.: US 11,509,523 B2
(45) Date of Patent: Nov. 22, 2022

(54) AUTOMATED SCRIPTING FOR MANAGED DEVICES

(71) Applicant: AirWatch, LLC, Atlanta, GA (US)

(72) Inventors: Jeff Wienstroer, Roswell, GA (US);
Hai James Le, Cumming, GA (US);
Prasad Sawant, Atlanta, GA (US);
Michael Jones, Hudson, OH (US)

(73) Assignee: AirWatch, LLC, Atlanta, GA (US)

( * ) Notice: Subject to any disclaimer, the term of this patent is extended or adjusted under 35 U.S.C. 154(b) by 387 days.

(21) Appl. No.: 15/238,813

(22) Filed: Aug. 17, 2016

(65) Prior Publication Data
US 2018/0054354 A1 Feb. 22, 2018

(51) Int. Cl.
*H04L 41/0806* (2022.01)
*G06F 16/16* (2019.01)
*H04L 41/08* (2022.01)
*H04L 41/046* (2022.01)
*G06F 8/61* (2018.01)
*H04L 41/0893* (2022.01)

(52) U.S. Cl.
CPC ............ *H04L 41/0806* (2013.01); *G06F 8/61* (2013.01); *G06F 16/168* (2019.01); *H04L 41/046* (2013.01); *H04L 41/0886* (2013.01); *H04L 41/0893* (2013.01)

(58) Field of Classification Search
CPC . H04L 41/0806; H04L 41/22; H04L 41/0893; H04L 41/046; H04L 41/0886; G06F 3/0482; G06F 17/30126; G06F 17/30; G06F 3/048; G06F 16/168; G06F 8/61; H04W 4/80; H04W 12/00; G06Q 10/00
See application file for complete search history.

(56) References Cited

U.S. PATENT DOCUMENTS

| | | | |
|---|---|---|---|
| 2002/0002684 A1* | 1/2002 | Fox ........................ | G06Q 40/00 726/6 |
| 2006/0064486 A1* | 3/2006 | Baron .................. | H04L 41/0886 709/224 |
| 2008/0005319 A1* | 1/2008 | Anderholm ......... | H04L 41/0866 709/224 |
| 2009/0036111 A1* | 2/2009 | Danford .................. | H04L 67/10 455/419 |
| 2009/0049518 A1* | 2/2009 | Roman ............... | H04L 41/0893 726/1 |
| 2010/0037088 A1* | 2/2010 | Krivopaltsev ...... | H04L 41/0206 709/224 |

(Continued)

*Primary Examiner* — Ariel Mercado
(74) *Attorney, Agent, or Firm* — Clayton, McKay & Bailey, PC

(57) ABSTRACT

Systems and methods are included for providing feature sets to groups of managed user devices within an enterprise mobility management (EMM) system. A feature set can enable a user device to detect one or more triggering events, and in response, automatically perform a specified action. An administrator can request a feature set using an interface provided by a management server. The management server can enroll the user device, install a management agent on the user device, and automatically build and deliver the requested feature set to the user device. After receiving the feature set, the management agent of the user device can monitor for recurring triggering events without further intervention from the management server.

17 Claims, 4 Drawing Sheets

(56) References Cited

U.S. PATENT DOCUMENTS

| | | | |
|---|---|---|---|
| 2010/0299152 A1* | 11/2010 | Batchu | H04M 3/4234 705/1.1 |
| 2013/0081104 A1* | 3/2013 | Jung | G06F 21/629 726/1 |
| 2013/0176940 A1* | 7/2013 | Hohammed | H04W 8/205 370/328 |
| 2013/0239126 A1* | 9/2013 | Sun | G06Q 10/06 719/318 |
| 2014/0007193 A1* | 1/2014 | Qureshi | G06F 21/10 726/3 |
| 2014/0115693 A1* | 4/2014 | Schieman | G06F 21/577 726/17 |
| 2015/0019991 A1* | 1/2015 | Kristj nsson | H04L 41/0853 715/747 |
| 2016/0057000 A1* | 2/2016 | Piekarski | H04L 43/10 709/221 |
| 2016/0170774 A1* | 6/2016 | Krishnamurthy | G06F 9/4451 713/100 |

* cited by examiner

DEVICES > STAGING & PROVISIONING > COMPONENTS >

EVENT ACTIONS

⊕ ADD EVENT: [SEARCH LIST]

| EVENT NAME | DESCRIPTION | EVENT TYPE | MANAGED BY | |
|---|---|---|---|---|
| | 410 | 420 | 430 | 440 |
| EVENT 1 | CHECK IN CONSOLE | WIFI CONNECTION | ADMIN 1 | ✎ ❐ ✕ ▷ |
| EVENT 2 | LAUNCH APP | UPDATE REGISTRY | ADMIN 1 | ✎ ❐ ✕ ▷ |
| EVENT 3 | TERMINATE APP | LOCATION | ADMIN 2 | ✎ ❐ ✕ ▷ |
| EVENT 4 | END BACKGROUND PROCESS | BATTERY LEVEL | ADMIN 2 | ✎ ❐ ✕ ▷ |

Sidebar:
- HUB
  - DASHBOARD
  - LIST VIEW
- DEVICES
  - > LIFECYCLE
  - > PROFILES
- ACCOUNTS
  - > COMPLIANCE POLICIES
  - > CERTIFICATES
  - > STAGING & PROVISIONING
- APPS & BOOKS
  - PRODUCT DASHBOARD
  - PRODUCT LIST VIEW
- CONTENT
  - ∨ COMPONENTS
  - AGENT PACKAGES
- EMAIL
  - APPLICATIONS
- TELECOM
  - CONDITIONS
  - FILES/ACTIONS
- GROUPS & SETTINGS
  - PROFILES
  - EVENT ACTIONS
  - PRODUCT SETS
  - > CUSTOM ATTRIBUTES

FIG. 4

AUTOMATED SCRIPTING FOR MANAGED DEVICES

BACKGROUND

Enterprises increasingly rely on user devices to achieve their business goals. Many enterprises utilize an Enterprise Mobility Management ("EMM") system to manage groups of user devices. While EMM systems can provide robust, customizable solutions, enterprises sometimes want additional feature sets tailored to their specific business goals. For example, a national retail chain can use an EMM system to manage devices used in their retail stores. The retail chain might want to add a custom feature that automatically launches an application on the devices upon detecting a particular triggering event.

If this additional feature set is not supported by the EMM system's built-in functionality, adding the feature is time consuming and expensive, if not impossible. Unsupported features typically require manual scripting, which is a technical and labor-intensive process. As a result, an enterprise would face large costs and long lead times in order to implement a desired feature. These obstacles hinder technological and business advancements.

Additional obstacles exist for EMM systems that include user devices that do not maintain consistent connectivity to an EMM server. For example, a user device at a remote job site might not be able to connect to an EMM server, in which case certain features that depend on interaction with the EMM server can be rendered moot. For these types of enterprise devices, custom features are necessary to empower a user device to manage itself more effectively. But again, these custom features require an unacceptable amount of time, specialized programming knowledge, and money.

As a result, a need exists for systems and methods that provide an administrator with the ability to quickly and easily implement custom feature sets by utilizing an automated scripting functionality.

SUMMARY

Examples described herein include systems and methods for providing feature sets to groups of managed user devices within an EMM system. An example system can include a management server capable of interacting with a user device. The management server can execute instructions contained on a non-transitory, computer-readable medium to perform various stages. For example, the management server can enroll a user device with the management server. Enrollment can include a registration process that authenticates the device and its user(s). As part of the enrollment process, the management server can cause a management agent to be installed on the user device. The management agent can be software that is stored on the user device and executed by a processor of the user device.

The management server can also assign the user device to a functional group. A functional group can be defined using any relevant criteria, including a type of user, a type of device, a location of the device, or a retail store associated with the device, for example. The management server can transmit a feature set to the user device, based on that user device belonging to a relevant functional group. The feature set can include instructions for the user device to carry out operations such as monitoring for events and taking actions in response to those events. This can include monitoring and acting as defined in a manifest file.

The feature set can be built based on selections made at the management server. For example, an administrator can build a feature set by selecting options at a console. The console can include a user interface, for example, that is operatively connected to the management server. The administrator can build the feature set to include an action that is associated with a triggering event. The triggering event can be monitored on an ongoing or recurring basis, such that each instance of the triggering event causes an action to be carried out. The feature set can instruct the management agent installed on the user device to carry out instructions without further input from the management server.

Example triggering events can include, for example, a battery level of the user device being above or below a threshold level, a memory-usage level of the user device being above or below a threshold level, or a registry value of the user device being equal to a predefined value. Multiple triggering events can be associated with an action, such that all of the required triggering events must be present for the management agent to perform the associated action. The management agent can continue monitoring for triggering events after performing an action, such that the feature set continues operating for recurring triggering events.

After the administrator selects the desired options for building the feature set, the management server can build the feature set in the form of a script. The script can be delivered to the user device, along with instructions to install the feature set. The instructions can be part of a manifest file, which can list one or more scripts to perform.

The feature set can specify a variety of actions to be carried out by the management agent of the user device. For example, the feature set can instruct the management agent to launch or terminate a managed application installed on the user device. In another example, the feature set can instruct the management agent to manipulate files or folders, such as copying files, moving files, deleting files, renaming a file, creating a folder, deleting a folder, or renaming a folder. In yet another example, the feature set can instruct the management agent to launch a script stored on the user device. In any of these examples, the management agent can carry out actions without further input from the management server.

Also disclosed is an example method for executing a feature set at a managed user device within an EMM system. The method can include a stage of enrolling with a management server. The management server can assign a functional group to the user device and cause a management agent to be installed on the user device. The method can also include receiving at the user device, from the management server, a feature set, based on the user device belonging to the functional group. The feature set can be built based on selections at the management server, and can associate an action with a recurring triggering event. The action can be carried out by the management agent in response to detecting the triggering event. The feature set can cause the management agent to monitor for the triggering event, even after carrying out an associated action.

Both the foregoing general description and the following detailed description are exemplary and explanatory only and are not restrictive of the examples, as claimed.

BRIEF DESCRIPTION OF THE DRAWINGS

FIG. 4 is an exemplary illustration of a user interface for building a feature set to be provided to a managed user device.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for providing feature sets to groups of managed user devices within an EMM system. A feature set can enable a user device to detect one or more triggering events, and in response, automatically perform a specified action. An administrator can build a feature set using an interface provided by a management server. The management server can enroll the user device, cause a management agent to be installed on the user device, and assign the user device to a functional group. Once the feature set is built, the management agent can deliver the feature set to the user device based on it belonging to the appropriate functional group. The user device can carry out any instructions in the feature set. To build the feature set, an administrator can make selections at the management server, such as at a console of the management server, and associate an action with one or more triggering events. The management server can deliver a script to the user device reflecting the built feature set, including instructions for the management agent on the device to install the feature set, monitor for any triggering events, and carrying out any actions associated with those triggering events. In one example, multiple scripts for detecting events and carrying out actions are included or identified in a manifest file. The management agent can monitor for recurring triggering events without further intervention from the management server.

Figure 1:
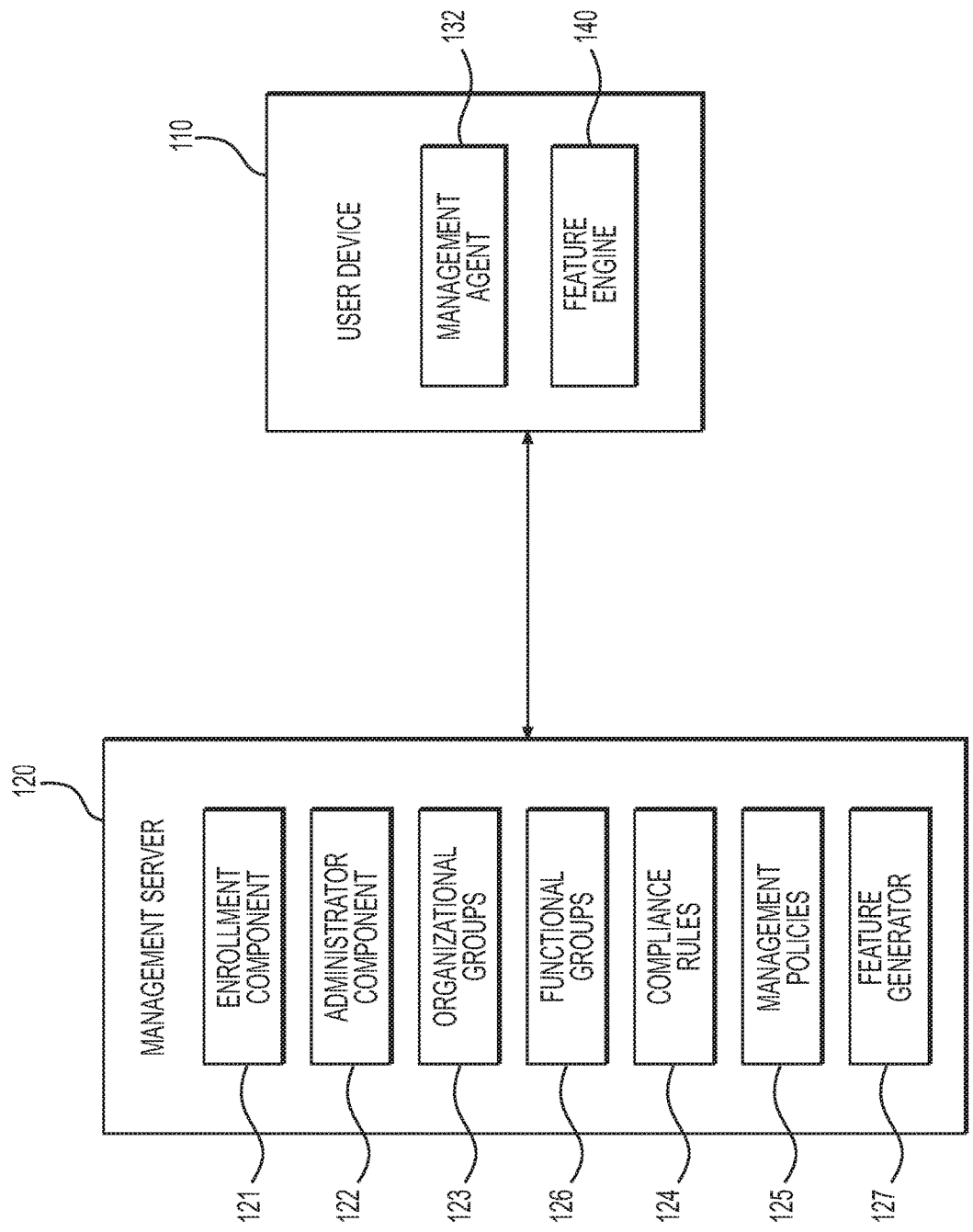
FIG. 1 is an exemplary illustration of system components for providing a feature set to a managed user device.
Figure 2:
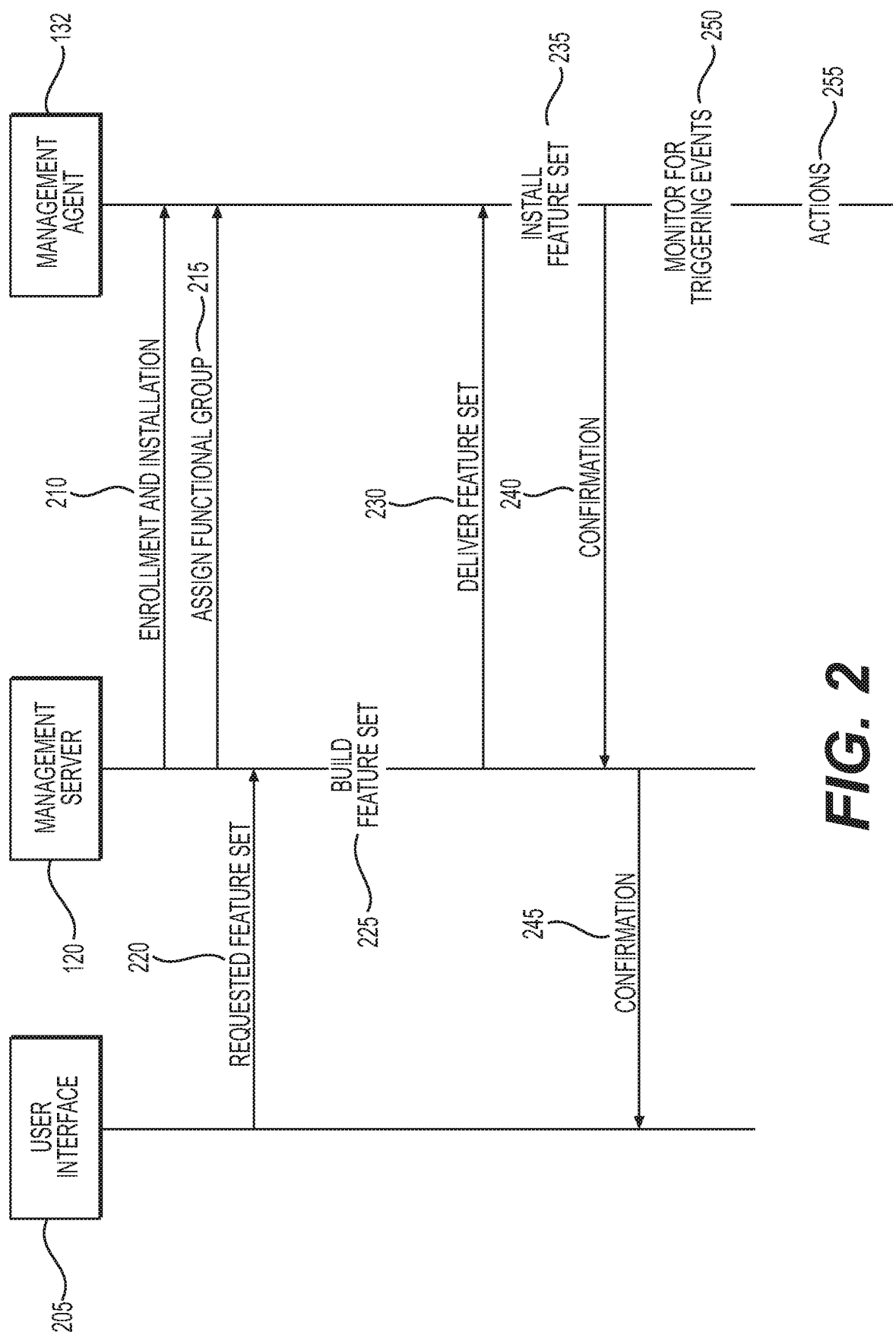
FIG. 2 is a diagram of an exemplary method for providing a feature set to a managed user device.
Figure 3:
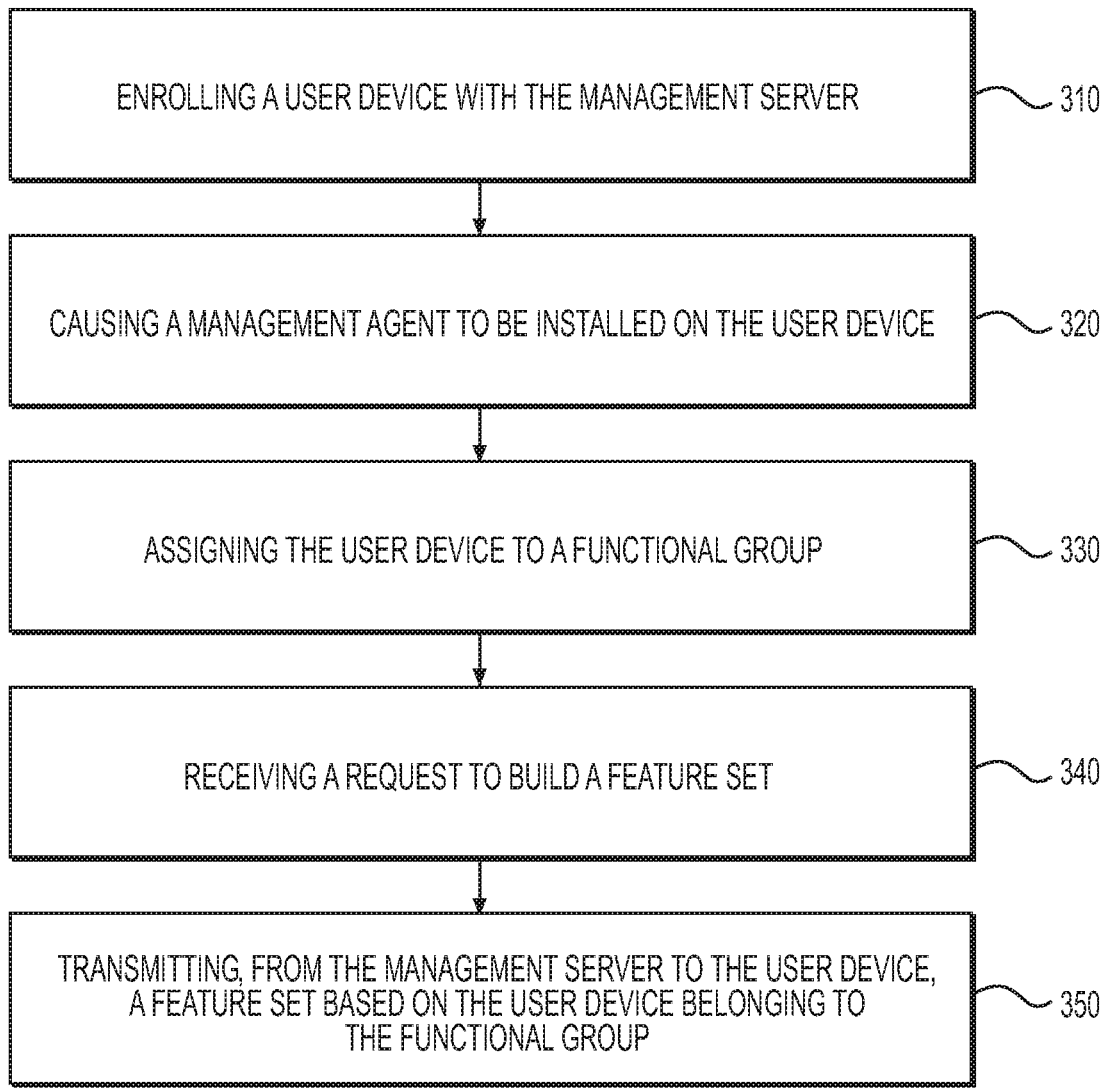
FIG. 3 is a flowchart of an exemplary method for providing a feature set to a managed user device.

FIG. 1 provides an illustration of an example system for providing a feature set to a managed user device, including device enrollment and compliance monitoring. FIGS. 2 and 3 provide diagrams of example methods for providing a feature set to a managed user device. FIG. 4 provides an example illustration of a user interface for building a feature set to be provided to a managed user device. Each of these figures is discussed in more detail below.

Turning to FIG. 1, an illustration of an example system is shown for providing a feature set to a user device 110. A user device 110 can include any computing device, such as a cell phone, laptop, tablet, personal computer, workstation, handheld scanner, card reader, or register. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device," "device," "user devices," and "devices" are used interchangeably, as appropriate.

The user device 110 can enroll with a management server 120—for example, as part of an overall EMM or Mobile Device Management ("MDM") system. The EMM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein.

The management server 120 can monitor and manage the operation of user devices 110, through the management server 120 itself, or more specifically, through a management service or program executing on the management server 120. Although one user device 110 is shown, the management server 120 can monitor and manage the operation of multiple user devices 110 enrolled in an EMM system. The management server 120 can also provide access to email, calendar data, contact information, and other enterprise resources to enrolled user devices 110. A system administrator can have privileges associated with managing, editing, revising, and otherwise administrating functions associated with the management server 120.

The management server 120 can include components for enrolling the user device 110 and confirming compliance. These features will be discussed in more detail below. As part of the enrollment process, the management server 120 can cause a management agent 132 to be installed on the user device 110. The management agent 132 can be a portion of an operating system for the user device 110, or it can operate in the application layer of the user device 110. For example, the management agent 132 can be a dedicated application or other software installed on the user device 110 that can monitor and manage data, software components, and hardware components associated with the user device 110. The management agent 132 can monitor and control functionality and other managed applications on the user device 110.

The management agent 132 can be an application, or portion of an application, that provides functionality beyond simply monitoring and managing resources in the user device 110. In one example, a developer can use a software development kit ("SDK") to insert, for example, security libraries into the application that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in a user device 110. For example, if a security library provides the ability to monitor and enable or disable functionality provided by an application, the management agent 132 can call functions provided by the library to monitor and enable or disable the functionality.

In addition to installing the management agent 132, the management server 120 can cause a feature engine 140 to be installed on the user device 110. The feature engine 140 can be a module within the management agent 132 or it can be a standalone application or software module on the user device 110. In some examples, as discussed in more detail below, the feature engine 140 can supplement the management agent 132 by sharing or handling a portion of the management agent's 132 workload. References to the management agent 132 performing an action, such as monitoring for a triggering event or carrying out an associated action, are intended to optionally include the feature engine 140.

In the example of FIG. 1, the management server 120 includes various components related to EMM system management, as well as components related to delivering feature sets to user devices 110. The components related to delivering feature sets will be discussed first. These components include, for example, a module for functional groups 126 and a feature generator 127.

Functional groups 126 can define groups of users, or groups of user devices 110, that are intended to receive a particular feature set. A functional group 126 can be defined using any relevant criteria, including a type of user, a type of device, a location of the device, or a retail store associated with the device, for example. For example, an enterprise can operate retail stores in multiple locations across the country. In each retail store, the enterprise can provide a group of user devices 110 to employees to perform work-related actions while on duty. In one example, the enterprise can assign functional groups 126 based on the particular retail store to which the user device 110 is assigned, such that each retail store is associated with a distinct functional group 126. In another example, an enterprise can assign functional groups 126 based on the intended use of the device 110. For example, one functional group 126 can apply to user devices 110 that are used to check, set, or change product prices in a store. Another functional group 126 can apply to user devices 110 carried by repair personnel that spend their work hours travelling to different locations. Additional functional groups 126 can apply to user devices 110 carried by particular teams of employees that travel to unique locations or have unique job functions.

A user device 110 can belong to any number of functional groups 126. For example, a user device 110 can belong to a functional group 126 associated with a particular retail store, as well as a functional group 126 associated with a particular repair team from that retail store.

Functional groups 126 can be used to determine which user devices 110 receive a feature set. When an administrator builds a feature set, he or she can select one or more functional groups 126 to receive that feature set. A feature set can be sent to a single functional group 126 or to multiple functional groups 126. The management server 120 can determine whether a user device 110 belongs to a selected functional group 126 before transmitting a feature set to that user device 110.

During the process of building a feature set, the management server 120 can utilize a feature generator 127. The feature generator 127 can receive a request to build a feature set from an administrator. For example, an administrator can request a feature set by accessing a user interface on a console. The user interface, discussed more with respect to FIGS. 2 and 4, can allow the administrator to select one or more triggering events and one or more associated actions. A feature set can also include either an "AND" or "OR" operator associated with the triggering events. That is, the administrator can require multiple triggering events, or only one of a group of triggering events, in order to perform an action. Similarly, the administrator can require multiple actions to be taken in response to the triggering event(s).

In one example, an administrator can request a feature set that launches an application upon the user device 110 obtaining a wireless Internet connection. In that example, the triggering event is obtaining a wireless Internet connection, while the action associated with the triggering event is launching an application.

In another example, an administrator can request a feature set that launches an application based on a registry value. For example, when a process is running on a user device 110, it can cause a registry entry to change from one value to another. In that example, the triggering event is the registry entry changing to a specified value, and the action associated with that event is launching an application.

In yet another example, an administrator can request a feature set that launches a script based on a condition of the user device 110, such as the device being plugged into an AC power outlet. For example, the script can cause the device 110 to upload information to a server once the device 110 is on AC power. In that example, the triggering event is the device 110 being on AC power, and the associated action is running the desired script. These examples are not intended to be limiting. Other examples are possible using any combination of triggering events or actions.

The feature generator 127 can receive a request from the administrator, for example through a console operatively connected to the management server 120, and then build the feature set. Building the feature set can include, for example, creating a script that causes a management agent 132 of a user device 110 to carry out the actions specified by the feature set. In some examples, the feature generator 127 can store or access a library that contains scripts for performing various actions. For example, the library can include scripts for monitoring the user device 110 for each type of triggering event, as well as scripts for combining multiple triggering events in either an "AND" or "OR" fashion. The library can also include scripts for carrying out various actions, such as scripts for launching or terminating applications, sending information to a server, modifying a file or folder, executing a run command, and other actions. Finally, the library can include any additional coding necessary to combine various triggering events with actions. The feature generator 127 can access the library and retrieve scripts based on the feature set requested by the administrator. The feature generator 127 can then combine the appropriate scripts and optionally test the functionality of the combined script before sending it to the user device 110. The management server 120 can deliver the completed feature set to the management agent 132 of a user device 110 for implementation. The user device 110 can then carry out any instructions in the feature set.

After the feature set has been installed on the user device 110, the management agent 132 can monitor the user device 110 for any triggering events specified by the feature set. For example, the management agent 132 can monitor whether the device 110 has a wireless Internet connection, is hooked to AC power, is within a geographic area, has a certain battery level remaining, is using a threshold percentage of available memory, or any other item capable of being monitored. The management agent 132 can access a native application program interface ("API") of the operating system on the device 110 and thereby access any information made available by the API. The management agent 132 can also access the registry of the user device 110 and monitor values for particular entries within the registry. As explained above, these functions can be performed by the management agent 132, the feature engine 140, or both.

When a triggering event is detected, the management agent 132 can cause an associated action, or multiple actions, to be taken by the user device 110. These actions can include, for example, installing an application, launching an application, terminating an application, checking into the management server 120, sending information to the management server 120, sending information to a different server or different device 110, creating a file or folder, renaming a file or folder, moving a file or folder, deleting a file or folder, and deleting data from the device. This list is not exhaustive, and other actions are also possible. Actions can be taken by either the management agent 132 or the feature engine 140, or both. Additionally, multiple actions can be tied to a particular feature set or triggering event. For example, a single triggering event—such as a registry value being equal to a predetermined value—can be tied to multiple actions, including launching an application and sending data to a server.

In addition to having components related to building and delivering feature sets, the management server 120 can also include components directed to overall EMM system management. For example, as mentioned above, the management server 120 can include components for enrolling the user device 110 and confirming compliance. With respect to enrollment, the management server 120 can include an enrollment component 121 and an administrator component 122, either or both of which can be used for the process of enrolling a user device 110. For example, the user device 110 can communicate with the enrollment component 121 during the initial stages of enrollment. In some examples, the enrollment component 121 can provide a token to the user device 110 indicating that the user device 110 has been authenticated and is permitted to communicate and enroll with the management server 120. The management server 120 or enrollment component 121 can provide the user device 110 with information regarding how to access and communicate with the administrator component 122 in order to continue the enrollment process.

In some examples, the administrator component 122 can request a token from the user device 110, indicating that the user device 110 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 110 and the enrollment process. In some examples, the administrator component 122 can be dedicated to a particular enterprise or group of enterprises, while the enrollment component 121 can be shared across multiple different enterprises.

In addition to the enrollment component 121 and administrator component described above, the management server 120 can include one or more organizational groups 123. Organizational groups 123 can be used by the management server 120 to apply compliance rules 124 or management policies 125 to particular groups of user devices 110. Organizational groups 123 can be distinguished from functional groups 126 in that organization groups 123 are created and managed for the purpose of administering EMM functions, while functional groups 126 are created and managed for the purpose of delivering feature sets to be carried out by the user device 110, as explained in more detail below.

An organizational group 123 can include data representing a group of user devices 110 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

The management server 120 can also include compliance rules 124. A compliance rule 124 can set forth one or more conditions that must be satisfied in order for a user device 110 to be deemed compliant. If compliance is broken, the management server 120 can take steps to control access of the user device 110 to enterprise files, applications, and email. Compliance rules 124 can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 110 is compliant can be made by the management server 120, the user device 110, or a combination of both. For example, the management agent 132 on the user device 110 can generate a data object that describes the state of the user device 110, including any settings, parameters, applications, or other information regarding the state of the user device 110. The data object can be analyzed by the management server 120 or the user device 110 to determine whether the user device 110 is in compliance with compliance rules 124. In the case of the user device 110 analyzing compliance, a management agent 132 installed on the user device 110 can make the comparison between the data object and compliance rules 124.

In some examples, a compliance rule 124 can specify one or more conditions. If a condition occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions.

A management policy 125 can specify that a user device 110 has permission to perform or access certain functionality. For example, the user device 110 can be restricted to certain enterprise repositories and functions within applications. In one example, the management policy 125 applies to an organizational group 123, with which the user device 110 can be associated. The organizational group 123 can change over time and include different user devices 110 over time. But because the management policy 125 is associated with the organizational group 123 rather than the any particular user device 110, the management policy 125 can apply to all user devices 110 within the organizational group 123 at any given time.

In one example, the user device 110 can become a member of, or become associated with, an organizational group 123 when an administrator specifies that the user device 110 should be a member. In another example, the user device 110 becomes associated with an organizational group 123 when a membership condition is satisfied, such as through a dynamic evaluation of the membership condition. A membership condition can be created by an administrator 110 by specifying a condition relating to the user device 110 that, when satisfied, causes the user device 110 to be associated with the organizational group 123. Similarly, the membership condition can be created such that when a condition relating to the user device 110 is met (or not met), the user device 110 is removed from the organizational group 123.

Alternatively, a user device 110 can become disassociated with an organizational group 123 based on the user of the user device 110. For example, an administrator 110 or dynamic evaluation can identify an individual for additional to, or removal from, an organizational group 123. If the user operates multiple user devices 110, all of the user's user devices 110 can be added to, or removed from, the organizational group 123 of interest. In this way, all of the user's user devices 110 can be made subject to a uniform set of management policies 125 and compliance rules 124.

As part of the enrollment or management of a user device 110, an administrator 110 can create a device record for the user device 110. The device record can be stored on the management server 120, and can include data related to the management of the user device 110. For example, the device record can include data describing one or more of: the identity and type of the user device 110; components of the user device 110; the state of the user device 110; organizational groups 123 to which the user device 110 belongs; compliance rules 124 with which the user device 110 must comply; and management policies 125 that specify if, when, and how the user device 110 is permitted to function.

For example, data describing the identity and type of the user device 110, as well as the components of the user device 110, can include at least one or more of: a unique identifier associated with the user device 110; a device type of the user device 110 (e.g., a smartphone, a tablet computing, a laptop computer, a desktop computer, a server computer, or a virtualized instance of any of such computer types); and various software and hardware components of the user device 110 (e.g., operating system (or kernel or bios) type and version, processor type and speed, memory type and size, network interface types, various I/O component types such as camera, touchscreen, keyboard, mouse, printer).

The device record can also include data describing the state of the user device 110 can include, for instance, various settings that are applied to the user device 110. The data can also specify various applications that are installed on or being executed by the user device 110, and various files that are installed on or are accessible to the user device 110. Additionally, the data describing the state of the user device 110 can specify information related to the management of the user device 110, such as the last time the user device 110 provided data describing its state to the management server 120. The data can also describe whether the user device 110 is in a state of compliance with any applicable compliance rules 124, and whether any remedial actions have been (or are to be) taken as a result of a noncompliance with any applicable compliance rules 124.

The data describing organizational groups 123 to which the user device 110 belongs can, for example, include any organizational groups 123 of which the user device 110 is a member. The data can include a hard-coded relationship between the user device 110 and the organizational group 123, in one example. Alternatively, the relationship can be established by a dynamic evaluation of a membership condition associated with the organizational group 123.

The data describing compliance rules 124 with which the user device 110 must comply can, for instance, specify one or more remedial actions that should be performed in the event that an associated rule condition occurs. Data describing management policies 125 can include permissions of the user device 110, such as access rights, and settings that are being enforced upon the user device 110. In some examples, the data describing compliance rules 124 and the data describing management policies 125 can be obtained from an organizational record associated with an organizational group 123 to which the user device 110 is a member.

In some examples, an administrator 110 can manually input data into the administrator component 122 in order to generate a device record for a user device 110. In other examples, the administrator component 122 can obtain a data object, such as an electronic spreadsheet, extensible markup language (XML) file, or comma separated values (CSV) file. The administrator component 122 can extract information describing the user device 110 from the data object to create a corresponding device record. The device record for each user device 110 can include information identifying each user device 110 and its respective device record.

In some examples, after the administrator component 122 creates a device record for a user device 110, the management server 120 can detect whether the user device 110 is enrolled. For example, the management server 120 can determine whether a flag is set, indicating that the user device 110 is enrolled.

If the user device 110 is not yet enrolled, the management server 120 can automatically transmit information identifying the user device 110 to the enrollment component 121. For example, the user device 110 can transmit a device identifier, such as its media access control (MAC) address, to the enrollment component 121. In some examples, when the enrollment component 121 receives the device identifier, the enrollment component 121 can determine whether a corresponding device record exists. If there is no corresponding device record, the enrollment component 121 can determine that the user device 110 is not authorized to enroll.

FIG. 2 is a diagram of an exemplary method for providing a feature set to a user device 110. The diagram shows system interactions between a user interface 205, such as an interface provided on a console, a management server 120, and a management agent 132 installed on a user device 110. The user interface 205 is discussed in more detail with respect to FIG. 4. The method can begin at stage 210 with enrollment and installation of a management agent 132 on the user device 110, as discussed above with respect to FIG. 1.

At stage 215, the management server 120 can assign a functional group 126 to the user device 110 and send the assignment to the management agent 132. In some examples, the assignment of a user device 110 to a functional group 126 is stored at the management server 120 and not sent to the management agent 132. In either case, the user device 110 is assigned to a functional group 126 at stage 215, which can then be used to determine whether a requested feature set should be provided to a particular user device 110.

At stage 220, a feature set is requested of the management server 120 through the user interface 205. The user interface 205 can be presented through a console that is operatively connected to the management server 120. For example, the user interface 205 can be reached through an Internet browser on a computing device. Stage 220 can include selecting one or more triggering events and one or more actions, and associating the triggering event(s) with particular action(s). The user interface 205 provides a mechanism to make these selections. The user interface 205 can provide drop-down menus for various triggering events, including providing a selection of an "AND" or "OR" operator between triggering events. The user interface 205 can also provide drop-down menus for actions to carry out in response to the triggering events.

As an example, an administrator can request a feature set for launching an application upon the occurrence of a triggering event. To request this feature set, the administrator can select a triggering event from a menu—in this example, the triggering event can be a wireless Internet connection for the device 110. The administrator can add an additional triggering event if desired, such as the user device 110 having a battery level above 10%. The administrator can also select and "AND" operator such that both triggering events (the wireless Internet connection and the battery level) must be present to perform the specified action. With respect to the specified action, the administrator can select an action from a separate drop-down menu. In this example, the administrator can select an option for launching an application. When installed on a user device 110, this feature set would cause the user device 110 to launch the desired application when the device 110 had a wireless Internet connection at sufficient battery power. The administrator can also select a particular functional group, or multiple functional groups, that should receive the feature set.

At stage 225, the management server 120 builds the feature set requested at stage 220. Building the feature set can include, for example, creating a script that causes a management agent 132 of a user device 110 to carry out the actions specified by the feature set. In some examples, the management server 120 can store or access a library that contains scripts for performing various actions. For example, the library can include scripts for monitoring the user device 110 for each type of triggering event, as well as scripts for combining multiple triggering events in either an "AND" or "OR" fashion. The library can also include scripts for carrying out various actions, such as scripts for launching applications, deleting applications, sending information to a server, and other actions. Finally, the library can include any additional coding necessary to combine various triggering events with actions. The management server 120 can access the library and retrieve scripts based on the feature set requested at stage 220. For example, the options selected in the console can each correspond to one or more script modules that can be assembled by the management server 120. The management server 120 can then combine the appropriate scripts and optionally test the functionality of the combined script before sending it to the user device 110. Combining the scripts can include creating a manifest file that the management agent 132 can read to determine an order for executing script modules.

At stage 230, the management server 120 can deliver a feature set to the management agent 132 of the user device 110. This stage can include confirming that the user device 110 has been assigned to the correct functional group 126. If the user device 110 belongs to a functional group 126 that is authorized for the feature set, then the management server 120 can transmit the feature set to the user device 110.

At stage 235, the management agent 132 can install the feature set. The management agent 132 can cause the script associated with the feature set to be stored in the memory of the user device 110. Upon successful installation of the feature set, the management agent 132 can send confirmation to the management server at stage 240. The management server 120 can then cause a confirmation message to be displayed on the user interface 205 at stage 245. If the management server 120 does not receive confirmation at stage 240, it can attempt to deliver the feature set again, or query the management agent 132 for a status update regarding the feature set.

At stage 250, the management agent 132 can execute instructions associated with the feature set, including instructions to monitor for triggering events. Continuing the example above, the management agent 132 can monitor for a wireless Internet connection for the device 110 as well as the current battery level. The management agent 132 can create values representing the current state of the monitored items in a table, library, or registry, and check those values against values representing triggering events. For example, an entry in a table can correspond to the user device 110 either having or not having a wireless Internet connection. If that entry matches the value of the triggering event, the management server 120 can consider that event triggered.

At stage 255, the management agent 132 can perform actions in response to one or more triggering events occurring. Continuing the previous example, if the management agent 132 determines that the device 110 has established a wireless Internet connection and has a battery level of 10% or more, then the management agent 132 can carry out an action of launching an application. In an example, the management agent 132 can carry out actions by executing a script, or a portion of a script, received as part of the feature set.

After carrying out relevant actions, the management agent 132 can return to stage 250 to continue monitoring for triggering events. In some examples, the management agent 132 can delay before continuing to monitor for triggering events. For example, while a particular application is opened, the management agent 132 can suspend monitoring for a feature set that involves opening that application. In another example, the application can notify the management agent 132 that it has received information sufficient for a particular time period, such as 12 hours. In that example, the management agent 132 can suspend monitoring for 12 hours, and then resume monitoring at stage 250 after that time has elapsed.

FIG. 3 is a flowchart of another exemplary method for providing a feature set a user device 110. At stage 310, the method includes enrolling a user device 110 with the management server 120. Enrollment can include interactions between the user device 110 and the management server 120, including the enrollment component 121 and administrator component 122 of the management server 120, as discussed with respect to FIG. 1.

As part of enrollment, or as a result of a successful enrollment, the management server 120 can cause a management agent 132 to be installed on the user device at stage 320. The management agent 132 can be a portion of an operating system for the user device 110, or it can operate in the application layer of the user device 110. For example, the management agent 132 can be a dedicated application or other software installed on the user device 110 that can monitor and manage data, software components, and hardware components associated with the user device 110. The management agent 132 can monitor and control functionality and other managed applications on the user device 110.

At stage 330, the user device 110 can be assigned to a functional group 126. The management server 120 can assign the user device 110 to a functional group 126 based on any applicable criteria. In one example, the functional group 126 is defined by an administrator and assigned to the user device 110 during the enrollment process. In another example, the functional group 126 is defined through a request for a feature set, and assigned to the user device 110 in association with delivering the feature set. In yet another example, the functional group 126 is automatically determined based on information regarding the user device 110, such as its device type, location, user, or association with an organizational group 123.

At stage 340, the management server 120 can receive a request to build a feature set. The request can be received through a user interface 205, such as a console, and can include information sufficient to build and deliver a feature set to one or more user devices 110. For example, the request can include one or more triggering events and one or more actions associated with those triggering events. The request can also include time constraints, delays between executing particular actions, and other requested features.

At stage 350, the management server 120 can build a feature set and transmit it to the user device 110. The management server 120 can transmit the feature set to the user device 110 based on the user device 110 belonging to the proper functional group 126. For example, the request to build the feature set can include an instruction to only deliver the feature set to user devices 110 belonging to a particular functional group 126. In that case, the management server 120 confirms that the user device 110 belongs to that functional group 126 before transmitting the feature set to the user device 110.

FIG. 4 provides an illustration of an example user interface 205 for requesting a feature set to be built and provided to a user device 110. This user interface 205 depicts an administrator console that can be made available to an administrator with authority to request a feature set. The console can be accessed by a web browser connected to the Internet or connected directly to the management server 120, by a dedicated application on a computing device, or by a kiosk connected to the management server 120.

The administrator console can be used to manage various aspects of an EMM system, but in this example the Event Actions page of the user interface 205 is shown. The Event Actions page can include a list of feature sets (referred to as "events" in this example) that have already been implemented. Each event is associated with an event name 410, a description 420, event type 430, and a manager 440. For example, a first feature set is named "Event 1." Event 1 includes a description 420 of "Check In Console" and event type 430 "WiFi Connection." In this example, the event type 430 functions as the triggering event. In other words, for this particular feature set, the triggering event includes obtaining or having a WiFi connection. The action, carried out in response to the triggering event, is that the user device 110 checks in to the console or management server 120.

A second example feature set is included and named "Event 2." Event 2 uses a triggering event of a registry update. For example, a value in the registry may be changed from 0 to 1 to indicate that it has been updated (other values can be used, of course, depending on the registry update). When the management agent 132 determines that the value in the registry has been changed as set forth in the Event 2 feature set, the triggering event is considered to have occurred. In response, the management agent 132 causes the user device to launch an application.

A third example feature set is named "Event 3." Event 3 uses an event type 430 titled "Location," which can represent a triggering event such as the user device 110 being within a particular geographic location or geo-fenced area. When the management agent 132 determines that the user device 110 has entered (or departed from) the specified location, the management agent 132 can terminate an application running on the user device 110. If the application is not running, then the management agent 132 can take no further action. This example can be useful in a scenario where an administrator wishes to disable an application in a particular area, such as turning off a camera application when the user device 110 is in an area with classified or secret information.

A fourth example feature set is named "Event 4." This event uses an event type 430 titled "Battery Level," which can represent a triggering event such as the user device 110 falling below a predetermined battery-level threshold. For example, an administrator can require that when a user device 110 within a functional group 126 falls below a battery-level threshold, such as 10%, the user device 110 must end a background process. For example, a background process that checks for updates can be terminated. This function can help conserve battery charge until the user device 110 is placed on AC power. Any other battery level can be used for the threshold.

Other feature sets can be added by using the "Add Event" button on the user interface 205. An administrator can also review, edit, and delete existing feature sets using the access buttons associated with each Event Action. In the case of more complicated feature sets that utilize multiple triggering events or multiple actions, or both, the user interface 205 can display the various triggering events or actions, including their associated operators such as "AND" or "OR."

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for controlling a mobile device, comprising:
receiving a request for a feature set including an action to take in response to a first triggering event and a second triggering event occurring on the mobile device, the request identifying a functional group with which the mobile device is associated;
accessing a library of available automated scripts, the library comprising:
a first automated script for detecting the first triggering event, the first triggering event including a registry value of the user device being equal to a predefined value, wherein the registry value is set based on whether a first process is running on the mobile device;
a second automated script for performing the action, the action including launching an application at the user device and uploading device information to a server;
a third automated script for detecting a second triggering event, the second triggering event including the user device being connected to AC power; and
a fourth automated script for combining the first and second triggering events and the action, wherein combining comprises causing both the first and second triggering events to be required before performing the action,
wherein the first and second triggering events and the action are available in the library based on selections on a graphical user interface ("GUI") that includes selectable fields for each of the first and second triggering events, the action, and for assigning an administrator to manage those selections;
retrieving the first, second, third, and fourth automated scripts based on the requested feature set;
packaging the first, second, third, and fourth automated scripts into a combined script to form the feature set;
assigning the feature set to the functional group; and
sending the feature set to the mobile device based on the mobile device being associated with the functional group, the feature set causing the user device to:
monitor for occurrence of the first and second triggering events defined in the feature set;

in response to occurrence of the first and second triggering events, execute the one or more automated scripts to carry out the action by launching the application and uploading device information to the server;
suspend monitoring for occurrence of the first and second triggering events for a period of time; and
resume monitoring for occurrence of the first and second triggering events after the period of time has elapsed.

2. The method of claim 1,
wherein the request:
identifies a second functional group associated a retail store of the enterprise; and
requests a unique set of features for the second functional group, including unique actions and triggering events;
the method further comprising:
generating a second feature set for the second functional group; and
sending the second feature set to a second mobile device assigned to the second functional group.

3. The method of claim 1, further comprising:
creating a manifest file identifying a plurality of automated scripts, the manifest file defining an order for executing the plurality of automated scripts.

4. The method of claim 1, further comprising testing functionality of the combined script before sending the feature set to the mobile device.

5. The method of claim 1, further comprising:
enrolling the mobile device with an enterprise mobility management system; and
installing a management agent on the mobile device, wherein sending the feature set to the mobile device comprises sending the feature set to the management agent.

6. The method of claim 5, wherein the management agent executes the automated scripts.

7. A system, comprising:
a mobile device having a processor and a memory, wherein the mobile device:
remotely requests, using a server, a feature set including an action to take in response to a first triggering event and a second triggering event occurring on the mobile device, the request identifying a functional group with which the mobile device is associated;
accesses, using the server, a library of available automated scripts, the library comprising:
a first automated script for detecting the first triggering event, the first triggering event including a registry value of the user device being equal to a predefined value, wherein the registry value is set based on whether a first process is running on the mobile device;
a second automated script for performing the action, the action including launching an application at the user device and uploading device information to a server;
a third automated script for detecting a second triggering event, the second triggering event including the user device being connected to AC power; and
a fourth automated script for combining the first and second triggering events and the action, wherein combining comprises causing both the first and second triggering events to be required before performing the action,
wherein the first and second triggering events and the action are available in the library based on selections on a graphical user interface ("GUI") that includes selectable fields for each of the first and second triggering events, the action, and for assigning an administrator to manage those selections;
retrieves the first, second, third, and fourth automated scripts based on the remotely requested feature set;
packages, using the server, the first, second, third, and fourth automated scripts into a combined script to form the feature set;
assigns the feature set to the functional group;
receives, from the server, the feature set based on the mobile device being associated with the functional group;
monitors, at the mobile device, for occurrence of the first and second triggering events defined in the feature set;
in response to occurrence of the first and second triggering events, executes, at the mobile device, the one or more automated scripts to carry out the action by launching the application and uploading device information to the server;
suspends monitoring for occurrence of the first and second triggering events for a period of time; and
resumes monitoring for occurrence of the first and second triggering events after the period of time has elapsed.

8. The system of claim 7,
wherein the request:
identifies a second functional group associated a retail store of the enterprise; and
requests a unique set of features for the second functional group, including unique actions and triggering events; and
wherein the server:
generates a second feature set for the second functional group; and
sends the second feature set to a second mobile device assigned to the second functional group.

9. The system of claim 7, wherein the server further:
creates a manifest file identifying a plurality of automated scripts, the manifest file defining an order for executing the plurality of automated scripts.

10. The system of claim 7, wherein the server further tests functionality of the combined script before sending the feature set to the mobile device.

11. The system of claim 7, wherein the mobile device:
enrolls with an enterprise mobility management system associated with the server; and
installs a management agent, wherein sending the feature set to the mobile device comprises sending the feature set to the management agent.

12. The system of claim 11, wherein the management agent executes the automated scripts.

13. A non-transitory, computer-readable medium comprising instructions which, when executed by a processor, perform a method controlling a mobile device, the instructions being configured to cause the processor to:
remotely request a feature set including an action to take in response to a first triggering event and a second triggering event occurring on the mobile device, the request identifying a functional group with which the mobile device is associated;
access a library of available automated scripts, the library comprising:

a first automated script for detecting the first triggering event, the first triggering event including a registry value of the user device being equal to a predefined value, wherein the registry value is set based on whether a first process is running on the mobile device;

a second automated script for performing the action, the action including launching an application at the user device and uploading device information to a server;

a third automated script for detecting a second triggering event, the second triggering event including the user device being connected to AC power; and a fourth automated script for combining the first and second triggering events and the action, wherein combining comprises causing both the first and second triggering events to be required before performing the action, wherein the first and second triggering events and the action are available in the library based on selections on a graphical user interface ("GUI") that includes selectable fields for each of the first and second triggering events, the action, and for assigning an administrator to manage those selections;

retrieve the first, second, third, and fourth automated scripts based on the remotely requested feature set;

package the first, second, third, and fourth automated scripts into a combined script to form the feature set;

assign the feature set to the functional group;

send the feature set to the mobile device based on the mobile device being associated with the functional group;

monitor for occurrence of the first and second triggering events defined in the feature set;

in response to occurrence of the first and second triggering events, execute the one or more automated scripts to carry out the action by launching the application and uploading device information to the server;

suspend monitoring for occurrence of the first and second triggering events for a period of time; and resume monitoring for occurrence of the first and second triggering events after the period of time has elapsed.

14. The computer-readable medium of claim 13, wherein the request:

identifies a second functional group associated a retail store of the enterprise; and requests a unique set of features for the second functional group, including unique actions and triggering events; and wherein the instructions are further configured to cause the processor to:

generate a second feature set for the second functional group; and send the second feature set to a second mobile device assigned to the second functional group.

15. The computer-readable medium of claim 13, wherein the instructions are further configured to cause the processor to:

create a manifest file identifying a plurality of automated scripts, the manifest file defining an order for executing the plurality of automated scripts.

16. The computer-readable medium of claim 13, wherein the instructions are further configured to cause the processor to test functionality of the combined script before sending the feature set to the mobile device.

17. The computer-readable medium of claim 13, wherein the instructions are further configured to cause the processor to:

enroll the mobile device with an enterprise mobility management system; and install a management agent on the mobile device, wherein sending the feature set to the mobile device comprises sending the feature set to the management agent.

* * * * *